United States Patent
Meng et al.

(10) Patent No.: US 11,904,313 B2
(45) Date of Patent: Feb. 20, 2024

(54) LIQUID QUANTIFYING DEVICE AND APPLICATION THEREOF

(71) Applicant: GUANGZHOU WONDFO BIOTECH CO., LTD., Guangdong (CN)

(72) Inventors: Xuan Meng, Guangdong (CN); Huifang Wan, Guangdong (CN); Haisheng Hu, Guangdong (CN); Wenmei Li, Guangdong (CN)

(73) Assignee: GUANGZHOU WONDFO BIOTECH CO., LTD., Guangzhou (CN)

( * ) Notice: Subject to any disclaimer, the term of this patent is extended or adjusted under 35 U.S.C. 154(b) by 439 days.

(21) Appl. No.: 17/051,169

(22) PCT Filed: Feb. 19, 2019

(86) PCT No.: PCT/CN2019/075465
§ 371 (c)(1),
(2) Date: Oct. 27, 2020

(87) PCT Pub. No.: WO2019/205781
PCT Pub. Date: Oct. 31, 2019

(65) Prior Publication Data
US 2021/0362149 A1    Nov. 25, 2021

(30) Foreign Application Priority Data
Apr. 27, 2018   (CN) .......................... 201810395709.4

(51) Int. Cl.
*B01L 3/00*     (2006.01)
*G01F 1/7086*   (2022.01)
(Continued)

(52) U.S. Cl.
CPC ..... *B01L 3/502715* (2013.01); *B01L 3/50273* (2013.01); *B01L 3/502738* (2013.01);
(Continued)

(58) Field of Classification Search
CPC .......... B01L 3/502715; B01L 3/50273; B01L 3/502738; B01L 2200/0605;
(Continued)

(56) References Cited

U.S. PATENT DOCUMENTS

2002/0033193 A1\* 3/2002 McNeely ................ F15C 1/146
                                                            137/825
2004/0067167 A1\* 4/2004 Zhang .............. G01N 33/56966
                                                           422/82.05
(Continued)

FOREIGN PATENT DOCUMENTS

CN      105214744 A  \*  1/2016
CN      105214744 A      1/2016
(Continued)

OTHER PUBLICATIONS

International Search Report of PCT Patent Application No. PCT/CN2019/075465 dated May 29, 2019.

*Primary Examiner* — Benjamin R Whatley
*Assistant Examiner* — Alex Ramirez

(57) ABSTRACT

The invention discloses a liquid quantifying device which comprises a base body and a liquid quantifying area arranged on the base body; the liquid quantifying area is provided with a preset volume, two ends of the liquid quantifying area are respectively provided with a liquid quantitative inlet and a liquid quantitative outlet, the liquid flows into the liquid quantifying area from the liquid quantitative inlet and reaches the liquid quantitative outlet after the liquid quantifying area is filled; and a liquid identification device is arranged at a relevant position of the liquid quantitative outlet and used for identifying the liquid reaching the liquid quantitative outlet. The invention also discloses a use of the liquid quantifying device in a microfluidic chip. The invention can improve the accuracy of quantification and detection.

11 Claims, 2 Drawing Sheets

(51) Int. Cl.
*G01F 11/28* (2006.01)
*G01N 21/76* (2006.01)

(52) U.S. Cl.
CPC ...... *B01L 3/502761* (2013.01); *G01F 1/7086* (2013.01); *G01F 11/28* (2013.01); *B01L 2200/0605* (2013.01); *B01L 2200/0668* (2013.01); *B01L 2300/0663* (2013.01); *B01L 2300/0883* (2013.01); *B01L 2300/161* (2013.01); *B01L 2400/0478* (2013.01); *G01N 21/76* (2013.01)

(58) Field of Classification Search
CPC ..... B01L 2200/0668; B01L 2300/0663; B01L 2300/0883; B01L 2300/161; B01L 2400/0478; G01F 1/7086; G01F 11/28; G01N 21/76
See application file for complete search history.

(56) References Cited

U.S. PATENT DOCUMENTS

2016/0023208 A1* 1/2016 Fisher ................ B29C 65/1467
156/272.8
2017/0274196 A1* 9/2017 Nordon ................ B81B 1/006

FOREIGN PATENT DOCUMENTS

| CN | 107607475 A | * | 1/2018 | ........ B01L 3/502715 |
| CN | 107607475 A | | 1/2018 | |
| CN | 107930710 A | * | 4/2018 | |
| CN | 107930710 A | | 4/2018 | |

* cited by examiner

LIQUID QUANTIFYING DEVICE AND APPLICATION THEREOF

TECHNICAL FIELD

The invention relates to the field of fluid quantification, in particular to a liquid quantifying device and application thereof.

BACKGROUND ART

In Vitro Diagnosis (IVD) refers to taking a sample (blood, body fluid, tissue, etc.) from a human body for detection and analysis so as to diagnose a disease, corresponding instruments and reagents are required in the detection process, and the instruments and reagents constitute an in vitro diagnosis system. There are two systems for in vitro diagnosis; one is represented by a detection center laboratory, which has system modularization, automation and assembly line types of sample inspection, and thus has the advantages of high throughput, high efficiency and high sensitivity. However, the whole system has the defects of high cost, large occupied volume and needs professional operation, and is mainly applied to large hospitals. The other one is represented by point-of-care testing (POCT). The system has characteristics of integration, miniaturization, sample testing at any time and any place, and thus has the advantages of affordable price, simplicity in operation, and timely report of results. However, compared with the central laboratory, the system has the disadvantages of low sensitivity and low stability.

For POCT, microfluidic technology has been applied to in vitro diagnostic products at home and abroad. Microfluidics is an interdiscipline that controls the microfluidics on a chip with microchannels, and relates to the fields of biology, chemistry, fluid physics, electronics, optics, mechanical engineering, etc. Microfluidic devices are commonly referred to as microfluidic chips and are also referred to as Lab on a Chip. The basic operations, such as sample preparation, reaction, separation and detection in biological, chemical and medical analysis processes are usually concentrated on a chip to complete a system function. The existing microfluidic chip mainly adopts qualitative detection, has fewer microfluidic chips capable of realizing quantitative detection and is complex in structure. In particular, some of fluid quantifying devices related to adopt a containing bag with a specific volume; and although the quantifying structure is simple, the surface of the containing bag is extremely prone to a phenomenon of liquid hanging on the bag (namely, when the liquid is pressed out of the containing bag, part of the liquid is hung in the bag, and the whole liquid cannot be ensured to be pressed out), and the deformation amount of the containing bag is different when being subjected to pressing each time, so that the liquid quantity remained in the containing bag each time is inconsistent, and then the quantity of liquid extruded out is different. Especially when a small quantity of liquid is needed, the error is larger for the containing bag. Compared with the microfluidic chip, the quantity of dozens of microliters is needed, and the quantification accuracy of the containing bag cannot meet the requirement, the quantification accuracy is poor, and the detection result is influenced. Meanwhile, the containing bag needs to be built into the chip, which increases the production difficulty of the chip.

SUMMARY OF THE INVENTION

In one aspect, the invention provides a liquid quantifying device which is simple in structure and high in quantification accuracy.

The technical solution adopted by the invention is as follows. A liquid quantifying device comprises a base body and a liquid quantifying area arranged on the base body;
  the liquid quantifying area is provided with a preset volume, two ends of the liquid quantifying area are respectively provided with a liquid quantitative inlet and a liquid quantitative outlet, the liquid flows into the liquid quantifying area from the liquid quantitative inlet and reaches the liquid quantitative outlet after the liquid quantifying area is filled; and
  a liquid identification device is arranged at a relevant position of the liquid quantitative outlet and used for identifying the liquid reaching the liquid quantitative outlet.

In one of the embodiments, the liquid identification device is arranged on the outside of the base body. In one of the embodiments, the liquid identification device comprises a light source generating module and a photoelectric sensor; and the light source generating module, the liquid quantitative outlet and the photoelectric sensor are sequentially distributed in a vertical line.

In one of the embodiments, the liquid quantitative inlet is also provided with the liquid identification device.

In one of the embodiments, the liquid identification device comprises a light source generating module and a photoelectric sensor; the liquid identification device is arranged on the outside of the base body;
  the liquid identification devices arranged at the liquid quantitative outlet are sequentially distributed in a vertical line according to the light source generating module, the liquid quantitative outlet and the photoelectric sensor; and
  the liquid identification devices arranged at the liquid quantitative inlet are sequentially distributed in a vertical line according to the light source generating module, the liquid quantitative inlet and the photoelectric sensor.

In one of the embodiments, the base body comprises a top plate and a bottom plate, wherein the top plate is stacked and connected with the bottom plate; the liquid quantifying area is arranged at a junction of the top plate and the bottom plate;
  the light source generating module of the liquid identification device arranged at the liquid quantitative outlet is arranged right above a relevant position of the top plate corresponding to the liquid quantitative outlet, and the photoelectric sensor is arranged right below a relevant position of the bottom plate corresponding to the liquid quantitative outlet; and
  the light source generating module of the liquid identification device arranged at the liquid quantitative inlet is arranged right above a relevant position of the top plate corresponding to the liquid quantitative inlet, and the photoelectric sensor is arranged right below a relevant position of the bottom plate corresponding to the liquid quantitative inlet.

In one of the embodiments, the liquid quantifying area is a hexagonal structure.

In one of the embodiments, the liquid quantitative inlet of the liquid quantifying area has a width of 0.3-3 mm and a height of 0.3-3 mm; and the liquid quantitative outlet of the liquid quantifying area has a width of 0.3-3 mm and a height of 0.3-3 mm.

In one of the embodiments, the surface of the liquid quantifying area is a surface modified with a hydrophilic surface; the liquid quantitative inlet of the liquid quantifying area has a width of 0.3-5 mm and a height of 0.3-3 mm; and the liquid quantitative outlet of the liquid quantifying area has a width of 0.3-5 mm and a height of 0.3-3 mm.

In one of the embodiments, the surface of the liquid quantifying area is a surface modified with a hydrophobic surface, and the liquid quantitative inlet of the liquid quantifying area has a width of 0.3-2 mm and a height of 0.3-3 mm; and the liquid quantitative outlet of the liquid quantifying area has a width of 0.3-2 mm and a height of 0.3-3 mm.

In one of the embodiments, the base body comprises a top plate and a bottom plate, wherein the top plate is stacked and connected with the bottom plate; and the liquid quantifying area is arranged at a junction of the top plate and the bottom plate.

In one of the embodiments, the top plate is provided with a groove, the bottom plate is a smooth flat plate, and the groove cooperates with the bottom plate to form the liquid quantifying area.

In one of the embodiments, the base body is further provided with a liquid channel communicated with the liquid quantitative inlet.

In one of the embodiments, the base body is further provided with an air branch channel and an air inlet, one end of the air branch channel is communicated with the liquid channel, the other end of the air branch channel is communicated with the air inlet, and the communication position of the air branch channel with the liquid channel is adjacent to the liquid quantitative inlet of the liquid quantifying area.

In another aspect, the present invention also provides an use of the liquid quantifying device as described above in a microfluidic chip.

Compared with the prior art, the invention has the following beneficial effects.

According to the liquid quantifying device disclosed by the invention, a specific liquid quantifying area is combined with a liquid identification device at a liquid quantitative outlet to realize liquid quantification, and the liquid quantifying device is simple and novel in structure and high in quantification accuracy. By further arranging the liquid identification device at the liquid quantitative inlet, the flow of the liquid and possible bubbles in the base body can be conveniently monitored and controlled, and the quantification accuracy is further improved.

When the liquid quantifying device is applied to the microfluidic chip, the detection accuracy can be improved. Meanwhile, as the liquid identification device can be arranged on the outside of the chip, the production process difficulty of the chip can be simplified.

Figure 1:
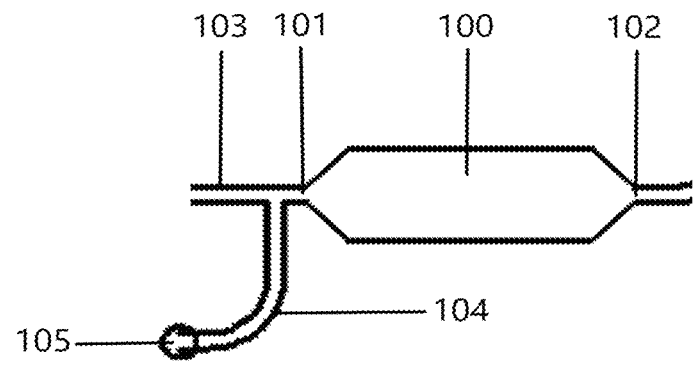
FIG. 1 is a structurally schematic view of a liquid quantifying device provided by the present invention.

In the drawings, 1, a top plate; 2, a sample inlet, 3, a whole blood filtering area; 4, a sample quantifying area; 5, an enzyme-labeled primary antibody embedding area; 6, a first mixing channel; 7, a magnetic bead labeled secondary antibody embedding area; 8, a second mixing channel; 9, a chemiluminescence detection area; 10, a diluent inlet; 11, a substrate luminescent liquid inlet; 12, a cleaning solution inlet; 13, a liquid driving force inlet; 14, an air inlet; 15, a sealing gasket; 16, a diluent branch channel; 17, a substrate luminescent liquid branch channel; 18, a cleaning solution branch channel; 19, a plunger pump; 20, a bottom plate; 21, a diluent storage pool; 22, a substrate luminescent liquid storage pool; 23, a cleaning solution storage pool; 24, a waste liquid pool; 25a/25b, a magnet; 26, magnetic beads; 27, an air branch channel; 28, a light source generating module; 29, a photoelectric sensor; 191, a liquid inlet of the plunger pump; 192, a liquid outlet of the plunger pump; 193, plunger; 194, a pump chamber; 30, a groove.

DETAILED DESCRIPTION OF THE INVENTION

The following is a clear and complete description of the technical solution of the embodiments of the invention in combination with the accompanying drawings of the embodiments of the invention. Obviously, the described embodiments are only part of the embodiments of the invention rather than all of them. Based on the embodiments of the present invention, all other embodiments obtained by those of ordinary skill in the art without involving any inventive effort are within the scope of the present invention.

Embodiment 1

Referring to FIG. 1, this embodiment provides a liquid quantifying device comprising a substrate and a liquid quantifying area 100 arranged on the substrate.

The liquid quantifying area 100 is provided with a preset volume, two ends of the liquid quantifying area are respectively provided with a liquid quantitative inlet 101 and a liquid quantitative outlet 102, the liquid flows into the liquid quantifying area 100 from the liquid quantitative inlet 101 and reaches the liquid quantitative outlet 102 after the liquid quantifying area 100 is filled.

A liquid identification device is arranged at a relevant position of the liquid quantitative outlet 102 and used for identifying the liquid reaching the liquid quantitative outlet 102.

In the above technical solution, since the liquid quantifying area 100 has a preset volume and allows the liquid to flow from the liquid quantitative inlet 101 into the liquid quantifying area 100 and reach the liquid quantitative outlet 102 after the liquid quantifying area 100 is filled; when the liquid reaches the liquid quantitative outlet 102, the liquid identification device can provide a liquid arrival signal indicating that the liquid has filled the liquid quantifying area 100. At this time, the liquid is controlled to stop entering the liquid quantifying area 100, so that the liquid is quantified in the liquid quantifying area 100, and the volume of the liquid obtained by the quantification is the volume of the liquid quantifying area 100.

It should be noted that the structure of the liquid identification device is not limited thereto, and the device for liquid identification can be used as the liquid identification device of the present invention. For example, the liquid sensing device disclosed in the patent application with the publication number "105214744A" can be used as the liquid identification device of the present invention. However, the structure of the liquid sensing device is relatively complex, and the conductive needle needs to be inserted into the chip, and contacts with the reactive liquid. In some cases, the experimental results will be affected. Preferably, the liquid identification device is arranged on the outside of the substrate, e.g. by optically enabling detection, and in a non-contact manner, which does not interfere with the detection and also facilitates the processing and manufacturing of the base body and chip.

Figure 2:
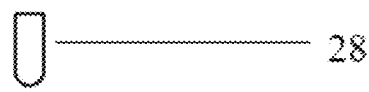
FIG. 2 is a schematic cross-sectional view of a liquid identification device provided by the present invention.
Figure 2:
Figure 3:
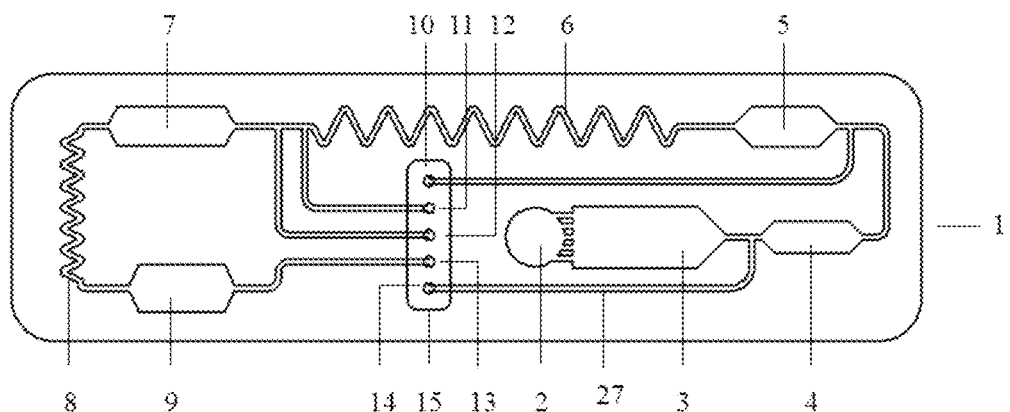
FIG. 3 is a structurally schematic view of an embodiment of a microfluidic chip provided by the present invention.

As shown in FIG. 2, preferably, the liquid identification device comprises a light source generating module 28 and a photoelectric sensor 29; and the liquid identification device is arranged on the outside of the base body;

the liquid identification devices arranged at the liquid quantitative outlet 102 are sequentially distributed in a vertical line according to the light source generating module 28, the liquid quantitative outlet 102 and the photoelectric sensor 29. The optical sensing is adopted to identify, quantify and control the liquid. Compared with a conductive contact mode, the method reduces the interference of metal on a reaction system in the chip, the detection efficiency can be improved, and the quantification accuracy can be further improved. Meanwhile, the liquid identification device can be arranged on the outside of the microfluidic chip and is convenient to fix in an instrument without being arranged on the chip, and the processing difficulty of the chip is reduced. When in use, the light source generating module and the photoelectric sensor are only required to be placed in alignment with the liquid identification site.

The light source generating module 28 is a module capable of providing a light source, which may be an LED, or a halogen lamp. Under the irradiation of the light source, because the transmittance and the refractive index of the gas and the liquid to the light are different, and the light intensity irradiated to the photoelectric sensor is different, the photoelectric sensor can identify the gas and the liquid so as to identify whether the liquid reaches a sensing point location. When the liquid flows to the liquid quantitative inlet or the liquid quantitative outlet, the liquid identification device can perform rapid identification so as to control the liquid to stop flowing into the liquid quantifying area.

Optionally, the liquid quantitative inlet 101 is also provided with the liquid identification device. Due to the arrangement of the liquid identification device, the flow of the liquid and possible bubbles in the base body can be conveniently monitored and controlled, so that the quantification accuracy can be further improved. Preferably, the liquid identification device at the liquid quantitative inlet 101 is the same as the liquid identification device at the liquid quantitative outlet 102. In a preferred embodiment, the liquid identification device at the liquid quantitative inlet 101 is arranged on the outside of the base body and comprises a light source generating module and a photoelectric sensor, wherein the light source generating module and the photoelectric sensor are arranged on the outside of the base body; the liquid identification devices arranged at the liquid quantitative inlet 101 are sequentially distributed in a vertical line according to the light source generating module 28, the liquid quantitative inlet 101 and the photoelectric sensor 29.

The liquid quantifying area 100 can be formed in the base body in a plurality of ways such as laser processing, mold injection molding processing and the like, and a specific shape of the groove 30 can be processed on the top plate 1 or the bottom plate 20 by the top plate 1 and the bottom plate 20 which are arranged to be separated, and then the both are mutually packaged. In a preferred embodiment, the base body comprises a top plate 1 and a bottom plate 20, since the former processing method is cumbersome; and the top plate 1 is stacked and connected with the bottom plate 20; and a liquid quantifying area 100 is provided at a junction of the top plate and the bottom plate 20. Correspondingly, the light source generating module 28 of the liquid identification device arranged at the liquid quantitative outlet 102 is arranged right above a relevant position of the top plate 1 corresponding to the liquid quantitative outlet 102, and the photoelectric sensor 29 is arranged right below a relevant position of the bottom plate 20 corresponding to the liquid quantitative outlet 102; and the light source generating module of the liquid identification device arranged at the liquid quantitative inlet 101 is arranged right above a relevant position of the top plate corresponding to the liquid quantitative inlet 101, and the photoelectric sensor is arranged right below a relevant position of the bottom plate corresponding to the liquid quantitative inlet 101.

In a more preferred embodiment, the top plate 1 is provided with a groove 30, the bottom plate 20 is a smooth flat plate, and the groove 30 cooperates with the bottom plate 20 to form a liquid quantifying area 100; and the liquid quantifying device is more convenient to prepare, the production process difficulty is reduced, only the special structure required by machining on the top plate is needed, and the production efficiency is improved.

The liquid quantifying area of the present invention can realize that "the liquid to be quantified flows into the liquid quantifying area from the liquid inlet of the liquid quantifying area and reaches the liquid outlet after the liquid quantifying area is filled". The shape and structure of the liquid quantifying area can be selected as required. The present invention is not limited in any way, and can include, for example, a pipe shape, a polygonal shape and the like. In an embodiment, the liquid quantifying area is a chamber of hexagonal structure.

Optionally, the liquid quantitative inlet 101 of the liquid quantifying area has a width of 0.3-3 mm (preferably 0.8-1.5 mm) and a height of 0.3-3 mm; and the liquid quantitative outlet 102 of the liquid quantifying area has a width of 0.3-3 mm (preferably 0.8-1.5 mm) and a height of 0.3-3 mm. The width of the liquid quantitative inlet is too wide or too narrow, and the height is too high or too low, which is not conducive to quantitative operation. When the width of the liquid quantitative inlet is too wide or too high, the liquid cannot fill the liquid quantifying area and flows to the liquid quantitative outlet, so that accurate liquid quantitative operation cannot be achieved. When the width of the liquid quantitative inlet is too narrow or too low, the length needs to be correspondingly increased to meet the volume requirements. This may result in increased chip length and volume.

Optionally, the surface of the liquid quantifying area 100 is a surface modified with a hydrophilic surface; the liquid quantitative inlet 101 of the liquid quantifying area has a width of 0.3-5 mm and and a height of 0.3-3 mm; and the liquid quantitative outlet 102 of the liquid quantifying area has a width of 0.3-5 mm and a height of 0.3-3 mm. Hydrophilic surface modifications include, but are not limited to, plasma, hydroxyl, carboxyl modifications. After the surface of the liquid quantifying area is subjected to the hydrophilic modification, the liquid filling in the cavity is facilitated; at the moment, the widths of the liquid quantitative inlet and the liquid quantitative outlet of the liquid quantifying area can be appropriately enlarged, and therefore the lengths of the liquid quantifying area and the chip can be reduced.

Optionally, the surface of the liquid quantifying area 100 is a surface modified with a hydrophobic surface, and the liquid quantitative inlet 101 of the liquid quantifying area has a width of 0.3-2 mm and a height of 0.3-3 mm; the liquid quantitative outlet 102 of the liquid quantifying area has a width of 0.3-2 mm and a height of 0.3-3 mm. After the surface of the liquid quantifying area is modified with the hydrophobic surface, the liquid can be prevented from hanging on the wall, and the liquid can reach the liquid quantitative outlet after the liquid quantifying area is filled.

Optionally, the base body is further provided with a liquid channel 103 communicated with the liquid quantitative inlet 101.

Furthermore, an air branch channel 104 and an air inlet 105 are arranged on the substrate, one end of the air branch channel 104 is communicated with the liquid channel 103, the other end of the air branch channel 104 is communicated with the air inlet 105, and the communication position of the air branch channel 104 with the liquid channel 103 is adjacent to the liquid quantitative inlet 101 of the liquid quantifying area. In an embodiment, "adjacent" is understood herein to mean "the distance between the communication position and the liquid quantitative inlet 101 of the liquid quantifying area is 0.5-10 mm (preferably 0.5-2 mm)". In use, the air inlet is connected with an air conduit external to the base body via a valve in an on-off manner to control the entry of air into the interior of the base body. The liquid flows into the liquid quantifying area through the liquid quantifying inlet. When the liquid flows to the liquid quantitative outlet of the liquid quantifying area, the liquid quantifying area is filled; at the moment, the liquid identifying device located at the liquid quantitative outlet sends a liquid arrival signal to control the air inlet to be opened; as the driving force required for the flow of the air in the air branch channel is small and the driving force required for the flow of the liquid is larger, the liquid stays at the communication position of the air branch channel with the liquid channel and does not continuously flow into the liquid quantifying area, and the separated specific amount of liquid can be obtained.

According to the embodiment, the liquid quantification is realized by combining the specific liquid quantifying area with the liquid identifying device at the liquid quantitative outlet, and the liquid quantifying device is simple and novel in structure and high in quantifying accuracy.

When the liquid quantifying device of the embodiment is applied to a microfluidic chip, the detection accuracy can be improve. Meanwhile, because the liquid identification device can be arranged on the outside of the chip, the production process difficulty of the chip can be simplified.

Embodiment 2

Referring now to FIGS. 2-6, the present embodiment provides a use of the liquid quantifying device of Example 1 on a microfluidic chip. In this embodiment, the microfluidic chip is a chemiluminescent microfluidic chip.

The chemiluminescent microfluidic chip comprises a chip body, and a sample inlet 2, a liquid driving force inlet 13, a substrate luminescent liquid inlet 11, a cleaning solution inlet 12, a substrate luminescent liquid branch channel 17, a cleaning solution branch channel 18, a main fluid channel and a plurality of functional areas arranged on the chip body; and the following is a detailed description.

In this embodiment, the main fluid channel is communicated with the plurality of functional areas to direct fluid flow between the functional areas.

The functional area comprises an enzyme-labeled primary antibody embedding area 5, a magnetic bead labeled secondary antibody embedding area 7 and a chemiluminescence detection area 9 which are sequentially communicated by the main fluid channel.

The enzyme-labeled primary antibody embedding area 5 is embedded with an enzyme-labeled primary antibody; the magnetic bead labeled secondary antibody embedding area 7 is embedded with a magnetic bead labeled secondary antibody; the magnetic bead labeled secondary antibody embedding area 7 is a liquid quantifying area; the liquid quantifying area is used for quantifying the liquid; and after the liquid to be quantified (e.g., the substrate luminescent liquid) enters the liquid quantifying area, the quantification can be achieved in the liquid quantifying area (i.e., a required amount of liquid is obtained) so as to react with a quantified liquid sample or other reaction reagent, thereby achieving quantitative detection.

In the embodiment, the liquid quantifying area has a preset volume, the liquid identification device is arranged at the liquid outlet of the liquid quantifying area, and the liquid to be quantified flows into the liquid quantifying area from the liquid inlet of the liquid quantifying area and reaches the liquid outlet after the liquid quantifying area is filled. When the liquid reaches the liquid outlet, the liquid identification device can provide a liquid arrival signal to indicate that the liquid has filled the liquid quantifying area; and at the moment, the liquid driving device is controlled to stop driving the liquid, so that the liquid quantification in the liquid quantifying area can be realized. The chemiluminescent microfluidic chip realizes the liquid quantification by combining a specific liquid quantifying area with a liquid driving device, and the quantification accuracy can be improved.

In this embodiment, the chemiluminescence detection area 9 is used for containing a chemiluminescent reaction product for binding with an external detection device to complete the detection process.

The sample inlet 2 and the liquid driving force inlet 13 are respectively communicated with the main fluid channel, and the driving force inlet 13 is used for being connected with the liquid driving device to drive the liquid to flow into or out of the functional area; and the sample inlet 2 is used for introducing a liquid sample into the main fluid channel, and the liquid sample enters each functional area via the main fluid channel.

In the embodiment, one end of the substrate luminescent liquid branch channel 17 is communicated with the substrate luminescent liquid inlet 11, the other end of the substrate luminescent liquid branch channel 17 is communicated with the liquid inlet of the magnetic bead labeled secondary antibody embedding area 7, and the substrate luminescent liquid enters the magnetic bead labeled secondary antibody embedding area 7 via the substrate luminescent liquid inlet 11 and the substrate luminescent liquid branch channel 17 for quantification.

One end of the cleaning solution branch channel 18 is communicated with the cleaning solution inlet 12, the other end of the cleaning solution branch channel 18 is communicated with the liquid inlet of the magnetic bead labeled secondary antibody embedding area 7, and the cleaning solution enters the magnetic bead labeled secondary antibody embedding area 7 via the cleaning solution inlet 12 and the cleaning solution branch channel 18 for magnetic bead cleaning.

When the microfluidic chip of the embodiment is used, the substrate luminescent liquid inlet 11 and the cleaning solution inlet 12 are respectively connected with the substrate luminescent liquid storage pool 22 and the cleaning solution storage pool 23 in an on-off manner by the valves V2 and V3, and the substrate luminescent liquid storage pool 22 and the cleaning solution storage pool 23 are respectively provided with openings communicated with outside air; and the liquid driving device is installed at the liquid driving force inlet 13 and used for driving the liquid flow in the chip; and magnets (e.g. magnets 25a, 25b) are fixed to the outside of the magnetic bead labeled secondary antibody embedding area 7 in order to fix the magnetic beads 26. The magnetic bead labeled secondary antibody embedding area is a liquid quantifying area, which can be used for quantifying a substrate luminescent liquid, and optionally can be further used for quantifying a cleaning solution.

A working mode of the microfluidic chip of the embodiment is as follows. A predetermined amount of liquid sample (such as serum or plasma diluted by a diluent) flows from a sample inlet 2 to an enzyme-labeled primary antibody embedding area 5 through a main fluid channel under the action of a liquid driving device and reacts with the enzyme-labeled primary antibody embedded therein in a mixed mode, then the reaction liquid reaches a magnetic bead labeled secondary antibody embedding area 7 and reacts with the magnetic bead labeled secondary antibody embedded therein in a mixed mode to form a reactant with a double-antibody sandwich structure on magnetic beads; and the magnetic beads are adsorbed by a magnet, the reactant is stabilized in the magnetic bead labeled secondary antibody embedding area 7 under the action of the magnetic beads, and the rest reaction liquid is discharged out of the chip via the liquid driving force inlet 13 under the action of the liquid driving device; and then an air inflow port (such as a sample entrance) is closed on the chip, a valve V3 is switched on between the cleaning solution storage pool 23 and the cleaning solution inlet 12, enabling the cleaning solution to enter the magnetic bead labeled secondary antibody embedding area 7 through the cleaning solution branch channel 18 under the action of the liquid driving device to clean the magnetic beads therein; the valve V3 between the cleaning solution storage pool 23 and the cleaning solution inlet 12 is switched off when the magnetic bead labeled secondary antibody embedding area 7 finishes quantifying the cleaning solution, an air inflow port is opened, the cleaned liquid is discharged out of the chip via the liquid driving force inlet 13 under the action of the liquid driving device; in order to ensure the cleaning effect, the cleaning can be repeatedly carried out several times (the magnetic bead cleaning mode is not limited to the mode described herein, but the magnetic bead cleaning can also be realized by moving a magnet in the cleaning solution, for example); then the air inflow port (such as a sample inlet) on the chip is closed, a valve V2 is switched on between the substrate luminescent liquid storage pool 22 and the substrate luminescent liquid inlet 11, enabling the substrate luminescent liquid to enter the magnetic bead labeled secondary antibody embedding area 7 through the substrate luminescent liquid branch channel 17 under the action of the liquid driving device; when the magnetic bead labeled secondary antibody embedding area 7 finishes the quantification of the substrate luminescent liquid, the valve V2 is switched off between the substrate luminescent liquid storage pool 22 and the substrate luminescent liquid inlet 11, the liquid driving device stops driving, the substrate luminescent liquid no longer flows into the magnetic bead labeled secondary antibody embedding area 7; the air inflow port (such as a sample entrance) on the chip is opened, the substrate luminescent liquid after the magnetic bead labeled secondary antibody quantification and the reactant captured by the magnetic beads carry out luminescent reaction, and then the magnet is removed; and the reaction liquid in the magnetic bead labeled secondary antibody embedding area 7 flows into the chemiluminescence detection area 9 to be detected under the action of the liquid driving device.

The chemiluminescent microfluidic chip has a compact structure. For example, the magnetic bead labeled secondary antibody embedding area is not only used for embedding the magnetic bead labeled secondary antibody, but also can be used for quantifying the substrate luminescent liquid as a liquid quantifying area, without additionally arranging a liquid quantifying area; and the magnetic bead labeled secondary antibody embedding area can be further used as a cleaning area for the magnetic beads, and there is no need to set up a separate cleaning area for the magnetic beads, which greatly saves the volume of the chip. Meanwhile, a reagent storage pool (such as a substrate luminescent liquid storage pool, a cleaning solution storage pool and the like) can be externally arranged on the chip; and compared with the prior art that the reagent package is embedded in the chip, the manufacturing process difficulty of the chip is reduced, and the detection accuracy is improved.

It should be noted that the main fluid channel and the plurality of functional areas can be formed inside the chip body by laser machining, mold injection molding and the like, or a specific shape can be formed on the top plate or the bottom plate by arranging the top plate and the bottom plate separately, and then the top plate and the bottom plate are packaged together. Since the former processing mode is complicated, in a preferred embodiment, the chip body comprises a top plate 1 and a bottom plate 20, the top plate 1 is stacked and connected with the bottom plate 20; the junction of the top plate 1 and the bottom plate 20 is provided with a main fluid channel and a plurality of functional areas; more preferably, the bottom plate 20 is a smooth flat plate, and the top plate 20 is provided with micropores, microchannels or micro-nano cavities to be matched with the bottom plate to form a sample inlet 2, a liquid driving force inlet 13, a substrate luminescent liquid inlet 11, a cleaning solution inlet 12, a substrate luminescent liquid branch channel 17, a cleaning solution branch channel 18, a main fluid channel or a plurality of functional areas, so that the microfluidic chip is more convenient to prepare, and the production process difficulty is further reduced; and only a special structure required by machining on the top plate is needed, and the production efficiency is further improved. In an embodiment, the bottom plate 20 is a smooth flat plate, the top plate 1 is provided with a plurality of microchannels to be combined with the bottom plate 20 to form a main fluid channel, the top plate 1 is provided with a plurality of microcavities to be combined with the bottom plate 20 to form a plurality of functional areas, and the top plate 1 is provided with a plurality of holes to be combined with the bottom plate 20 to form a sample inlet 2, a liquid driving force inlet 13, a substrate luminescent liquid inlet 11 and a cleaning solution inlet 12; and the size of the sample inlet 2 is typically larger than the size of the other inlets to facilitate sample introduction.

Therefore, the chip body of the chemiluminescent microfluidic chip can comprise a top plate and a bottom plate which are stacked, the structures to be processed can be arranged on the top plate, and the bottom plate is only a smooth flat plate, so that the manufacturing process difficulty of the chip can be further reduced, and the production efficiency can be improved.

Optionally, the liquid inlet of the liquid quantifying area is also provided with a liquid identification device. Due to the arrangement of the liquid identification device, the flow of the liquid and possible bubbles in the chip can be conveniently monitored and controlled, and the mixing between the two quantitative liquids can be realized.

Furthermore, the enzyme-labeled primary antibody embedding area 5 is also a liquid quantifying area, and a diluent inlet 10 and a diluent branch channel 16 are arranged on the chip body; and one end of the diluent branch channel 16 is communicated with the diluent inlet 10, the other end of the diluent branch channel 16 is communicated with the liquid inlet of the enzyme-labeled primary antibody embedding area 5, and the sample diluent enters the enzyme-labeled primary antibody embedding area 5 through the diluent inlet and the diluent branch channel for quantification. Furthermore, the liquid identification devices are respectively arranged at the liquid inlet and the liquid outlet of the enzyme-labeled primary antibody embedding area 5, the liquid to be quantified flows into the enzyme-labeled primary antibody embedding area 5 from the liquid inlet, and reaches the liquid outlet after the enzyme-labeled primary antibody embedding area 5 is filled. The sample diluent not only can dilute liquid samples (such as serum, plasma and the like) to reduce the concentration and viscosity of the liquid samples, and the contained substances therein also can reduce the background values of the liquid samples, so that the detection is more accurate. Meanwhile, the sample diluent can be used for redissolving the enzyme-labeled primary antibody better. According to the technical solution, the enzyme-labeled primary antibody embedding area can be used for quantifying the sample diluent without realizing the quantification of the sample diluent outside the chip, the quantified sample diluent can be mixed with the quantified liquid sample in the enzyme-labeled primary antibody embedding area, the labor can be saved, and the operation is more convenient. During use, the diluent inlet 10 is connected with the diluent storage pool 21 via the valve V1 in an on-off manner, and the diluent storage pool 21 is provided with an opening communicated with outside air; a predetermined amount of liquid sample (such as serum or plasma diluted by the diluent) flows from a sample inlet 2 to a liquid inlet of an enzyme-labeled primary antibody embedding area 5 through a main fluid channel under the action of a liquid driving device, an air inlet (such as a sample entrance) on the chip is closed, and a valve V1 is switched on between a diluent storage pool 21 and a diluent inlet 10; the sample diluent enters the enzyme-labeled primary antibody embedding area 5 through the dilution liquid branch channel 16 under the action of the liquid driving device; and when the sample diluent fills the enzyme-labeled primary antibody embedding area and reaches the liquid outlet of the enzyme-labeled primary antibody embedding area 5, the valve V1 is switched off between the diluent storage pool 21 and the diluent inlet 10, and the air inflow port (such as a sample entrance) is opened, wherein the liquid sample and the sample diluent can continue to flow under the negative pressure of the liquid driving device and can alternately act on the main fluid channel and the enzyme-labeled primary antibody embedding area 5 for mixing under the positive pressure and the negative pressure of the liquid driving device. Of course, better mixing can also be achieved by providing mixing channels.

Optionally, the chemiluminescence detection area 9 has a preset volume, a liquid identification device is arranged at the liquid outlet of the chemiluminescence detection area 9, the liquid to be detected flows into the chemiluminescence detection area 9 via the liquid inlet of the chemiluminescence detection area 9 and reaches the liquid outlet after the chemiluminescence detection area 9 is filled, and the volume of the chemiluminescence detection area 9 is smaller than or equal to the volume of the magnetic bead labeled secondary antibody embedding area 7. When the reaction liquid after the reaction of the substrate luminescent liquid and the reactant captured by the magnetic beads reaches the liquid outlet of the chemiluminescence detection area, the liquid identification device sends a signal, the liquid driving device controls the reaction liquid to stop flowing, and the detection can be carried out at the moment. Furthermore, a liquid identification site is also arranged at the liquid inlet of the chemiluminescence detection area 9, and the volume of the chemiluminescence detection area 9 is equal to the volume of the magnetic bead labeled secondary antibody embedding area 7.

Optionally, in order to facilitate mixing between liquid samples and reagents (sample diluent, substrate luminescent liquid and the like), the main fluid channel comprises a first mixing channel 6 and a second mixing channel 8; the first mixing channel 6 is arranged between the enzyme-labeled primary antibody embedding area 5 and the magnetic bead labeled secondary antibody embedding area 7; and the second mixing channel 8 is arranged between the magnetic bead labeled secondary antibody embedding area 7 and the chemiluminescence detection area 9.

Optionally, the sample inlet 2 and the liquid driving force inlet 13 are provided at both ends of the main fluid channel, respectively.

Figure 4:
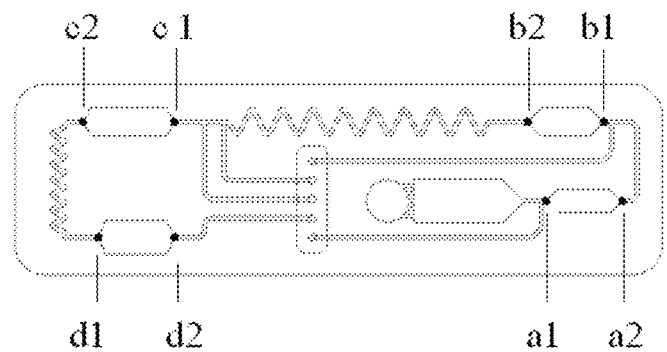
FIG. 4 is a structural view of sensor arrangement of an embodiment of the microfluidic chip provided by the present invention.

As shown in FIG. 4, optionally, in order to fix the magnetic beads conveniently, a magnet fixing site is arranged at a position, corresponding to the magnetic bead labeled secondary antibody embedding area 7, of the chip body. Further, since the cleaning of the magnetic beads can be performed in the magnetic bead labeled secondary antibody embedding area 7, in order to better realize the cleaning of the magnetic beads, a magnet fixing site for positioning the magnets 25a and 25b is respectively arranged above and below the magnetic bead labeled secondary antibody embedding area 7, and the two magnets 25a and 25b are arranged corresponding to diagonally opposite corners of the magnetic bead labeled secondary antibody embedding area 7.

Optionally, the functional area further comprises a sample quantifying area 4, the sample quantifying area 4 is also a liquid quantifying area, and the liquid sample flows into the sample quantifying area 4 via the sample inlet for quantitative determination; the sample quantifying area 4 is positioned upstream of the enzyme-labeled primary antibody embedding area 5; the microfluidic chip is further provided with an air inlet 14 and an air branch channel 27 communicated with the air inlet 14, one end of the air branch channel 27 is communicated with the air inlet 14, the other end of the air branch channel 27 is communicated with a main fluid channel between the sample quantifying area 4 and the sample inlet 2, and the communication position of the other end of the air branch channel 27 with the main fluid channel is adjacent to the sample quantifying area 4. Herein "adjacent" is generally understood as "0.5-10 mm (preferably 0.5-2 mm) from the liquid inlet of the sample quantifying area 4". Due to the arrangement of the sample quantifying area, the liquid sample can be quantified conveniently without additional quantification outside the chip, so that the chip is more convenient to use. Furthermore, a liquid identification device is arranged at a liquid outlet of the sample quantifying area 4, the liquid to be quantified flows into the sample quantifying area 4 from a liquid inlet of the liquid identification device, and reaches the liquid outlet after the sample quantifying area 4 is filled. Further, the liquid inlet of the sample quantifying area 4 is also provided with the liquid identification device.

When the microfluidic chip is used, the air inlet is connected with an air conduit external to the chip via a valve in an on-off manner so as to control the air to enter the chip. The liquid sample flows into the sample quantifying area from the liquid inlet of the sample quantifying area via the sample inlet under the action of the liquid driving device. When the liquid sample flows to the liquid outlet of the sample quantifying area, the sample quantifying area is filled; at the moment, the liquid identification device positioned on the liquid identification site of the liquid outlet sends an indication signal to control the opening of the air inlet; and the driving force required by the flow of air in the air branch channel is small, and the driving force required by the flow of the liquid sample is larger, so that the liquid sample stays at the communication position of the air branch channel with the main fluid channel and does not continuously flow into the sample quantifying area, and the quantification of the liquid sample in the sample quantifying area can be completed. The quantified liquid sample can continue to flow to the enzyme-labeled primary antibody embedding area under the action of the liquid driving device.

Optionally, the liquid sample is whole blood, a whole blood filtering area 3 is arranged between the sample inlet 7 and the sample quantifying area 4, and a whole blood filtering membrane is arranged in the whole blood filtering area 3. When the microfluidic chip is used for clinical diagnosis, whole blood is a common detection sample, and during detection, whole blood separation is usually required to separate serum or plasma in the whole blood and then react with a reagent; the whole blood filtering area is arranged in the chip and is convenient to detect and use; meanwhile, compared with a mode of quantifying whole blood firstly and then separating whole blood, the whole blood filtering area is arranged between the sample inlet and the sample quantifying area, the dosage of serum or plasma can be directly quantified by the sample quantifying area, and the measuring result is more accurate. The whole blood filtering membrane can be made of glass fibers, cotton linters, polyester fibers, fibers or blended fibers. Optionally, the thickness of the whole blood filtering pad is 0.2-2.5 mm; and the adsorption speed of the whole blood filtering pad is 4-150 s/4 cm, and the water absorption is 30-250 mg/cm$^2$.

Figure 5:
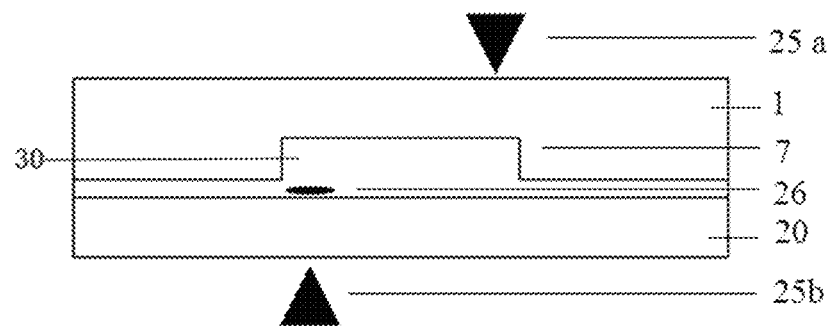
FIG. 5 is a schematic cross-sectional view showing a magnet arrangement position when the microfluidic chip provided by the invention is used.
Figure 6:
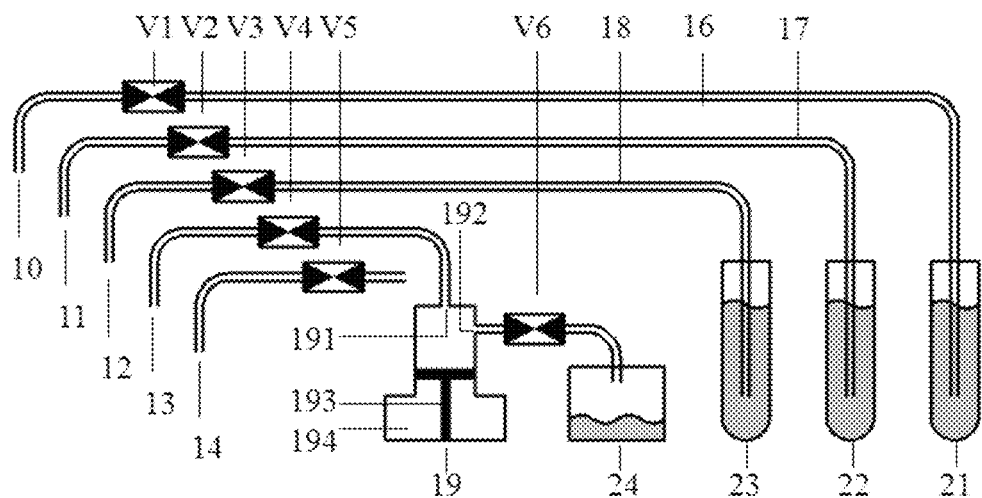
FIG. 6 is a structurally schematic view of an embodiment of the liquid driving device according to the present invention.

Referring to FIG. 5, optionally, the liquid driving device is a plunger pump 19. As far as the structure is concerned, the liquid driving device may be variously provided, such as an existing syringe pump, a diaphragm pump, a peristaltic pump and the like, and it is within the scope of the present invention to be able to drive the liquid under pressure to a predetermined area within the chip. Although the syringe pump, the diaphragm pump and the peristaltic pump can drive the liquid flow, they can not well control the liquid to stay in specific position, and the plunger pump can solve this problem better. The plunger pump suitable for the present invention can be a plunger pump well known to those skilled in the art, and generally comprises a pump chamber 194 and a plunger 193, wherein the pump chamber 194 is provided with a liquid inlet 191 and a liquid outlet 192, the top end of the plunger 193 is inserted into the pump chamber, and the plunger 193 reciprocates along the inner wall of the pump chamber 194 in the axial direction thereof; valves V4 and V6 are respectively arranged at the liquid inlet 191 and the liquid outlet 192. Since the plunger pump is widely used for sucking liquid and discharging liquid, two ports provided in the pump chamber are commonly referred to as "liquid inlet and liquid outlet". However, it should be noted that "liquid inlet and liquid outlet" herein are not limited to inlet liquid and outlet liquid. In the present embodiment, when the plunger pump is operated, the plunger moves downward after the valve V4 at the liquid inlet 191 is opened. At this time, the pressure of one end of the liquid adjacent to the liquid inlet 191 of the plunger pump becomes smaller, resulting in a pressure difference between the two ends of the liquid, and the liquid moves towards a direction of the liquid inlet 191 under the action of pressure difference. When the liquid reaches a preset position, a valve V6 at the liquid outlet is opened, so that the interior of the chip is communicated with the external atmosphere; under the action of air at the two sides (the air at one side enters the interior of the chip via the liquid outlet and the liquid inlet; and the air on the other side can enter the interior of the chip from an air inflow port (such as a sample inlet or an additionally arranged air branch channel)), the pressure at the two sides of the liquid is balanced, and the liquid can stay at a preset position.

The liquid quantifying area (including samples in the magnetic bead labeled secondary antibody embedding area, the enzyme-labeled primary antibody embedding area and the sample quantifying area) of the embodiment can realize that the liquid to be quantified flows into the liquid quantifying area from the liquid inlet of the liquid quantifying area and reaches the liquid outlet after the liquid quantifying area is filled. The shape and structure of the liquid quantifying area can be selected as required, and the invention does not limit this. For example, the liquid quantifying area can have a pipeline shape, a polygonal shape and the like.

Optionally, the liquid quantifying area is a hexagonal structure. Specifically, the liquid inlet and the liquid outlet of the liquid quantifying area are respectively two opposite corners of the hexagonal structure; and the angles of the two opposite corners are less than 120°.

Optionally, the liquid inlet of the liquid quantifying area has a width of 0.3-3 mm (preferably 0.8-1.5 mm) and a height of 0.3-3 mm; the liquid outlet of the liquid quantifying area has a width of 0.3-3 mm (preferably 0.8-1.5 mm) and a height of 0.3-3 mm. The width of the liquid inlet is too wide or too narrow, and the height of the liquid inlet is too high or too low, which is not conducive to quantitative operation. When the width of the liquid inlet is too wide or too high, the liquid cannot fill the liquid quantifying area and flows to the liquid outlet, so that accurate liquid quantification cannot be achieved. When the width of the liquid inlet is too narrow or too low, the length needs to be correspondingly increased to meet the volume requirements. This may result in increased chip length and volume.

Optionally, the surface of the liquid quantifying area is a surface modified with a hydrophilic surface; the liquid inlet of the liquid quantifying area has a width of 0.3-5 mm and a height of 0.3-3 mm; and the liquid outlet of the liquid quantifying area has a width of 0.3-5 mm and a height of 0.3-3 mm. Hydrophilic surface modifications include, but are not limited to, plasma, hydroxylation, or carboxylation modifications. After the surface of the liquid quantifying area is subjected to the hydrophilic modification, the liquid filling in the cavity is facilitated; at the moment, the widths of the liquid inlet and the liquid outlet of the liquid quantifying area can be appropriately enlarged, and therefore the lengths of the liquid quantifying area and the chip can be reduced.

Optionally, the surface of the liquid quantifying area is a surface modified with a hydrophobic surface; the liquid inlet of the liquid quantifying area has a width of 0.3-2 mm and a height of 0.3-3 mm; and the liquid outlet of the liquid quantifying area has a width of 0.3-2 mm and a height of 0.3-3 mm. The hydrophobic modifications include, but are not limited to, hydrophobic physical modifications, hydrophobic chemical modifications (e.g., nanoparticle coatings, alkyl groups with extended chains, etc.). After the surface of the liquid quantifying area is modified with the hydrophobic surface, the liquid can be prevented from hanging on the wall, and the liquid can reach the liquid outlet after the liquid quantifying area is filled.

This embodiment is not limited to the structure of the liquid identification device as long as the identification of the liquid can be realized. For example, the liquid sensing device disclosed in the patent application with the publication number "105214744A" can be used as the liquid identification device of the present invention. However, the structure of the liquid sensing device is relatively complex, and the conductive needle needs to be inserted into the chip, and contacts with the reactive liquid. In some cases, the experimental results will be affected. Preferably, the liquid identification device is arranged on the outside of the substrate by optically enabling detection, and in a non-contact manner, which does not interfere with the detection and also facilitates the processing and manufacturing of the base body and chip.

Preferably, the liquid identification device comprises a light source generating module 28 and a photoelectric sensor 29; the liquid identification site comprises an upper site for positioning the light source generating module 28 and a lower site for positioning the photoelectric sensor 29, wherein the upper site and the lower site are respectively arranged on the outside of the chip body; and the areas of the upper site, the corresponding liquid inlet or liquid outlet, and the lower site is sequentially distributed in a vertical line. Accordingly, the light source generating module 28, the corresponding liquid inlet or outlet, and the photoelectric sensor 29 are sequentially distributed in a vertical line. Since the liquid identification device can be arranged at the liquid inlet or the liquid outlet of the liquid quantifying area or the chemiluminescence detection area, 'the corresponding liquid inlet or the corresponding liquid outlet' here corresponds to the liquid inlet or the liquid outlet of the liquid quantifying area or the chemiluminescence detection area. For example, when the liquid outlet of the magnetic bead labeled secondary antibody embedding area is provided with the liquid identification device, the light source generating module, the liquid outlet of the magnetic bead labeled secondary antibody embedding area and the photoelectric inductor are sequentially distributed in a vertical line. When the liquid inlet of the magnetic bead labeled secondary antibody embedding area is provided with the liquid identification device, the light source generating module, the liquid inlet of the magnetic bead labeled secondary antibody embedding area and the photoelectric sensor are sequentially arranged in a vertical line. When the liquid outlet of the sample quantifying area is provided with the liquid identification device, the light source generating module, the liquid outlet of the sample quantifying area and the photoelectric sensor are sequentially distributed in a vertical line.

The optical sensing is adopted to identify, quantify and control the liquid. Compared with a conductive contact mode, the method reduces the interference of metal on a reaction system in the chip. Meanwhile, the liquid identification device can be arranged on the outside of the micro-fluidic chip and is convenient to fix in an instrument without being arranged on the chip, and the processing difficulty of the chip is reduced. When in use, the light source generating module and the photoelectric sensor are only required to be placed in alignment with the liquid identification site. Specifically, the chip body comprises a top plate 1 and a bottom plate 20; the top plate 1 is stacked and connected with the bottom plate 20; the junction of the top plate 1 and the bottom plate 20 is provided with a main fluid channel and a plurality of functional areas; the light source generating module 27 is positioned directly above a relevant position of the top plate 1 corresponding to the liquid inlet or the liquid outlet of the liquid quantifying area, and the photoelectric sensor 28 is positioned directly below a relevant position of the bottom plate 20 corresponding to the liquid inlet or the liquid outlet of the liquid quantifying area.

The light source generating module 28 is a module capable of providing a light source, which may be an LED, a halogen lamp, a laser lamp, etc. Under the irradiation of the light source, because the transmittance and the refractive index of the gas and the liquid to the light are different, and the light intensity irradiated to the photoelectric sensor is different, the photoelectric sensor can identify the gas and the liquid so as to identify whether the liquid reaches a sensing point location. When the liquid flows to the liquid quantitative inlet or the liquid quantitative outlet, the liquid identification device can perform rapid identification so as to control the liquid to stop flowing into the liquid quantifying area.

Alternatively, the communication position of the other end of the substrate luminescent liquid branch channel 17 with the liquid inlet of the magnetic bead labeled secondary antibody embedding area 7 is located on the main fluid channel of the liquid inlet of the magnetic bead labeled secondary antibody embedding area 7. In an embodiment, the "adjacent" is understood herein as "0.5-10 mm (preferably 0.5-2 mm) from the fluid inlet of the magnetic bead labeled secondary antibody embedding area 7".

Alternatively, the cleaning solution enters the magnetic bead labeled secondary antibody embedding area 7 via the cleaning solution inlet 12 and the cleaning solution branch channel 18 for quantification; the communication position of the other end of the cleaning solution branch channel 18 with the liquid inlet of the magnetic bead labeled secondary antibody embedding area 7 is located on the main fluid channel adjacent to the liquid inlet. In an embodiment, the "adjacent" herein is understood as "0.5-10 mm (preferably 0.5-2 mm) from the fluid inlet of the magnetic bead labeled secondary antibody embedding area 7". Preferably, the communication position of the other end of the cleaning liquid branch channel 18 with the liquid inlet of the magnetic bead labeled secondary antibody embedding area 7 is downstream of the communication position of the other end of the substrate luminescent liquid branch channel 17 with the liquid inlet of the magnetic bead labeled secondary antibody embedding area 7, so that dilution of the substrate luminescent liquid by the cleaning liquid can be avoided.

Optionally, the communication position of the other end of the diluent branch channel 16 with the liquid inlet of the enzyme-labeled primary antibody embedding area 5 is located on the main fluid channel adjacent to the liquid inlet of the enzyme-labeled primary antibody embedding area 5. In an embodiment, the "adjacent" herein is understood as "0.5-10 mm (preferably 0.5-2 mm) from the fluid inlet of the enzyme-labeled primary antibody embedding area 5".

Optionally, the volume of liquid inlet 2 is 5 ul-300 ul.

Optionally, the liquid outlet of the whole blood filtering area 3 is a triangular liquid outlet; the whole blood filtering area 3 has an area of 30-300 mm$^2$, a width of 2-20 mm, a length of 5-25 mm, a depth of 0.3-3 mm, and an angle of a front triangle of 15-160°.

Optionally, the volume of the sample quantifying area 4 is 1-50 ul.

Optionally, the volume of enzyme-labeled primary antibody embedding area 5 is 5-50 ul.

Optionally, a first mixing duct 6 and a second mixing duct 8 have a width of 200-2000 um, a length of 5-40 mm, and a depth of 0.2-3 mm.

Optionally, the volume of the magnetic bead labeled secondary antibody embedding area 7 is 10-200 ul.

Optionally, the chemiluminescence detection area 9 has a volume of 10-200 ul.

Next, a detection method of a microfluidic chip according to an embodiment of the present invention will be described with reference to FIGS. 2-6. The method comprises steps 101 to 110, wherein each step specifically comprises the following steps:

Step 101: inserting a steel needle which is respectively communicated with a diluent storage pool 21, a substrate luminescent liquid storage pool 22, a cleaning solution storage pool 23, a plunger pump 19 and air into a sealing gasket 15 in a chip, wherein the steel needle is respectively connected with a diluent inlet 10, a substrate luminescent liquid inlet 11, a cleaning solution inlet 12, a liquid driving force inlet 13 and an air inlet 14; and the whole blood sample is added to a sample inlet 2, a solenoid valve V4 is opened, and a negative pressure suction force is generated by the plunger pump 19 to suck the whole blood sample into the whole blood filtering area 3.

After the steel needle is inserted into the sealing gasket of the plunger pump 19, the plunger pump 19 generates a negative pressure suction force to suck the whole blood sample into the whole blood filtering area 3.

Step 102: sucking the serum into a sample quantifying area 4 after the whole blood sample is filtered, and completing quantitative measurement of the serum by photoelectric sensors (a1, a2) arranged on a liquid inlet and a liquid outlet of the sample quantifying area 4.

When the whole blood sample passes over the photoelectric sensor a1, the output voltage value of the sensor changes, and an identification signal is given to the system to judge the flowing position of the liquid in the chip. When the sample passes through the photoelectric sensor a2, it is judged that the sample fills the sample quantifying area 4, the intrinsic volume of which is the quantitative value of the sample.

Step 103: closing the sample inlet 2 and opening the solenoid valve V5, so that the serum is sucked into the enzyme-labeled primary antibody embedding area 5.

Step 104: closing the electromagnetic valve V5 and opening an electromagnetic valve V1 when the serum is detected by the photoelectric sensor (b1) arranged on the liquid inlet of the enzyme-labeled primary antibody embedding area 5, so that external sample diluent enters the enzyme-labeled primary antibody embedding area 5 from the electromagnetic valve V1.

Step 105: closing the electromagnetic valve V1, opening the electromagnetic valve V5, and sequentially generating positive and negative pressure suction by the plunger pump 19 when the external sample diluent is detected by the photoelectric sensor (b2) arranged on the liquid outlet of the enzyme-labeled primary antibody embedding area 5, so that the serum, the external diluent and the pre-embedded enzyme-labeled primary antibody flow back and forth to be redissolved between the enzyme-labeled primary antibody embedding area 5 and the first mixing duct 6 so as to obtain a first mixed solution.

Step 106: sucking the first mixed liquid into the magnetic bead labeled secondary antibody embedding area 7, and combining the first mixed liquid with the antigen antibody by the second mixing duct 8, with the formed reactant captured by magnetic beads; adsorbing the magnetic beads by the magnet outside the magnetic bead labeled secondary antibody embedding area 7 to be stabilized in the magnetic bead labeled secondary antibody embedding area 7, discharging the rest reaction liquid out of the chip via a liquid driving force inlet under the negative pressure suction of the plunger pump 19, and then carrying out the next cleaning step.

Step 107: closing the electromagnetic valve V5, opening an electromagnetic valve V3, enabling the external cleaning solution into the magnetic bead labeled secondary antibody embedding area 7, and controlling the injection amount of the cleaning solution by the photoelectric sensors (c1, c2) arranged on the liquid inlet and the liquid outlet of the magnetic bead labeled secondary antibody embedding area 7.

Step 108: after the external cleaning solution and the magnetic beads are repeatedly cleaned, adsorbing the magnetic beads by the magnets 25a and 25b, and generating negative pressure suction by the plunger pump to suck out the cleaned liquid and discharge it into an external waste liquid pool 24.

Step 109: closing the electromagnetic valve V3, opening an electromagnetic valve V2, enabling the external substrate luminescent liquid into the magnetic bead labeled secondary antibody embedding area 7, and controlling the injection amount of the substrate luminescent liquid by the photoelectric sensors (c1, c2).

Step 110: fully reacting the substrate luminescent liquid with the antigen antibody on the magnetic beads to obtain a reaction liquid, and transporting the reaction liquid to a chemiluminescence detection area 9 to complete chemiluminescence detection, wherein the photoelectric sensors (d1, d2) arranged on the liquid inlet and the liquid outlet of the chemiluminescence detection area 9 are used for detecting the capacity and the position of the reaction liquid.

According to the embodiment, the reaction principle between substances in the chemiluminescence microfluidic chip is the same as the reaction principle of the magnetic particle immune chemiluminescence. Namely, the antigen in the sample is bound with an enzyme-labeled primary antibody (the primary antibody is labeled with catalytic groups such as HRP, AP and the like) and then bound with a magnetic bead labeled secondary antibody (the secondary antibody is fixed on the magnetic beads) to form a double-antibody sandwich complex, the magnetic beads are adsorbed by a magnet, and the unbound antigen and the enzyme-labeled primary antibody are washed away; and the substrate reaction liquid is added, and enzyme groups such as HRP, AP and the like labeled on the primary antibody catalyze the substrate reaction liquid for luminescence. The luminescence intensity is directly proportional to the amount of antigen.

The chemiluminescent microfluidic chip in the embodiment has a compact structure. For example, the magnetic bead labeled secondary antibody embedding area is not only used for embedding the magnetic bead labeled secondary antibody, but also can be used for quantifying the substrate luminescent liquid as a liquid quantifying area, without additionally arranging a liquid quantifying area; and the magnetic bead labeled secondary antibody embedding area can be further used as a cleaning chamber for the magnetic beads, and there is no need to set up a separate cleaning chamber for the magnetic beads, which greatly saves the volume of the chip. Meanwhile, a reagent storage pool (such as a quantitative substrate luminescent liquid storage pool, a cleaning solution storage pool and the like) can be externally arranged on the chip; and compared with the prior art that the reagent package is embedded in the chip, the manufacturing process difficulty of the chip is reduced, and the detection accuracy is improved.

According to the embodiment, the chip body of the chemiluminescent microfluidic chip can comprise a top plate and a bottom plate which are stacked, the structures to be processed can be arranged on the top plate, and the bottom plate is only a smooth flat plate, so that the manufacturing process difficulty of the chip can be further reduced, and the production efficiency can be improved.

It will be appreciated by those skilled in the art that all or part of the processes for implementing the methods of the embodiments described above may be implemented by the relevant hardware instructed by computer programs which may be stored in a computer readable storage medium and which, when executed, may include the processes of the embodiments of the methods described above. The storage medium may be a magnetic disk, an optical disk, a read-only memory (ROM), a random access memory (RAM), and so on.

The above mentioned is the preferred embodiment of the invention. It will be understood by those skilled in the art that various changes and modifications may be made without departing from the principle of the invention and fall in the scope of the invention.

What is claimed is:

1. A liquid quantifying device, comprising a base body and a liquid quantifying area arranged in the base body;
   the liquid quantifying area is provided with a preset volume, two ends of the liquid quantifying area are respectively provided with a liquid quantitative inlet and a liquid quantitative outlet, the liquid flows into the liquid quantifying area from the liquid quantitative inlet and reaches the liquid quantitative outlet after the liquid quantifying area is filled; and
   a liquid identification device is arranged at the liquid quantitative outlet and used for identifying the liquid reaching the liquid quantitative outlet;
   wherein the base body is further provided with a liquid channel communicated with the liquid quantitative inlet, an air branch channel and an air inlet; one end of the air branch channel is communicated with the liquid channel, the other end of the air branch channel is communicated with the air inlet, the air inlet is connected with an air conduit external to the chip via a valve in an on-off manner so as to control the air to enter the chip; and a communication position of the air branch channel with the liquid channel is 0.5-10 mm away from the liquid quantitative inlet of the liquid quantifying area; and
   the liquid quantitative inlet of the liquid quantifying area has a width of 0.3-3 mm and a height of 0.3-3 mm; and the liquid quantitative outlet of the liquid quantifying area has a width of 0.3-3 mm and a height of 0.3-3 mm.

2. The liquid quantifying device according to claim 1, characterized in that the liquid identification device is provided on the outside of the base body.

3. The liquid quantifying device according to claim 2, characterized in that the liquid identification device comprises a light source generating module and a photoelectric sensor; and
   the light source generating module, the liquid quantitative outlet and the photoelectric sensor are sequentially distributed in a vertical line.

4. The liquid quantifying device according to claim 1, characterized in a liquid identification device is further provided at the liquid quantitative inlet.

5. The liquid quantifying device according to claim 4, characterized in that the liquid identification device provided at the liquid quantitative inlet comprises a light source generating module and a photoelectric sensor; the liquid identification device provided at the liquid quantitative inlet is arranged on the outside of the base body;
   the light source generating module, the liquid quantitative outlet and the photoelectric sensor of the liquid identification device at the liquid quantitative outlet are sequentially distributed in a vertical line; and
   the light source generating module, the liquid quantitative inlet and the photoelectric sensor of the liquid identification device at the liquid quantitative inlet are sequentially distributed in a vertical line.

6. The liquid quantifying device according to claim 5, characterized in that the base body comprises a top plate and a bottom plate, and the top plate is stacked and connected with the bottom plate; the liquid quantifying area is arranged at a junction of the top plate and the bottom plate;
   the light source generating module of the liquid identification device arranged at the liquid quantitative outlet is arranged right above a position of the top plate corresponding to the liquid quantitative outlet, and the photoelectric sensor arranged at the liquid quantitative outlet is arranged right below a position of the bottom plate corresponding to the liquid quantitative outlet; and
   the light source generating module of the liquid identification device arranged at the liquid quantitative inlet is arranged right above a position of the top plate corresponding to the liquid quantitative inlet, and the photoelectric sensor arranged at the liquid quantitative inlet is arranged right below a position of the bottom plate corresponding to the liquid quantitative inlet.

7. The liquid quantifying device according to claim 1, characterized in that the liquid quantifying area is a hexagonal structure.

8. The liquid quantifying device according to claim 1, characterized in that the surface of the liquid quantifying area is a surface modified with a hydrophilic surface.

9. The liquid quantifying device according to claim 1, characterized in that the surface of the liquid quantifying area is a surface modified with a hydrophobic surface, and the liquid quantitative inlet of the liquid quantifying area has a width of 0.3-2 mm and a height of 0.3-3 mm; and the liquid quantitative outlet of the liquid quantifying area has a width of 0.3-2 mm and a height of 0.3-3 mm.

10. The liquid quantifying device according to claim 1, characterized in that the base body comprises a top plate and a bottom plate, the top plate is provided with a groove, the bottom plate is a smooth flat plate, and the top plate is stacked and connected with the bottom plate to allow the groove to be closed by the bottom plate and to form the liquid quantifying area.

11. The liquid quantifying device according to claim 1, wherein the liquid quantifying device is used in a microfluidic chip.

\* \* \* \* \*